United States Patent [19]
Few et al.

[11] Patent Number: 5,348,264
[45] Date of Patent: Sep. 20, 1994

[54] QUICK RELEASE SEAT PEDESTAL

[75] Inventors: Jeffrey P. Few, West Hills, Calif.; William B. Leftwich, Elkhart, Ind.

[73] Assignee: Norco Industries, Inc., Compton, Calif.

[21] Appl. No.: 68,849

[22] Filed: May 28, 1993

[51] Int. Cl.⁵ .................................. A47B 97/00
[52] U.S. Cl. .................... 248/503.1; 296/63
[58] Field of Search ............ 248/500, 503, 503.1; 296/63

[56] References Cited

U.S. PATENT DOCUMENTS

| | | | |
|---|---|---|---|
| D. 331,342 | 12/1992 | Kinda | D6/480 |
| 3,123,402 | 3/1964 | Elston | 297/385 |
| 4,230,432 | 10/1980 | Howell | 248/503.1 X |
| 4,277,043 | 7/1981 | Weik | 248/503.1 |
| 4,331,349 | 5/1982 | Funahashi | 280/801 |
| 4,376,522 | 3/1983 | Banks | 248/503.1 |
| 4,396,175 | 8/1983 | Long et al. | 248/503.1 |
| 4,569,190 | 2/1986 | Gilmore | 57/201 |
| 4,598,951 | 7/1986 | Ono | 297/483 |
| 4,616,878 | 10/1986 | Fohl | 297/483 |
| 4,634,184 | 1/1987 | Hitson | 297/468 |
| 4,667,917 | 5/1987 | Takace | 248/398 |
| 4,674,801 | 6/1987 | DiPaola et al. | 297/472 |
| 4,722,573 | 2/1988 | Komohara | 297/468 |
| 4,759,580 | 7/1988 | Berklich, Jr. et al. | 296/64 R |
| 4,787,512 | 11/1988 | Dosser, III | 206/223 |
| 4,789,126 | 12/1988 | Rice et al. | 248/503 |
| 4,805,952 | 2/1989 | Coleman | 296/65.1 |
| 4,865,377 | 9/1989 | Musser et al. | 296/65.1 |
| 4,889,389 | 12/1989 | White | 297/468 |
| 4,971,357 | 11/1990 | Nakasaki et al. | 280/801 |
| 4,971,379 | 11/1990 | Rumpel | 296/63 |
| 5,015,010 | 5/1991 | Homeier et al. | 280/808 |
| 5,020,856 | 6/1991 | George | 497/483 |
| 5,058,829 | 10/1991 | Bentley | 248/503.1 X |
| 5,125,711 | 6/1992 | Syed et al. | 296/68.1 |

Primary Examiner—Ramon O. Ramirez
Attorney, Agent, or Firm—Fulwider, Patton, Lee & Utecht

[57] ABSTRACT

A quick release pedestal seat mount to support a passenger seat from the floor of a recreational vehicle includes a base plate for mounting on the floor of the recreational vehicle and a seat mounting box to which a seat may be attached. The seat mounting box may be quickly secured to the base plate by means of a set of hold down cleats which fit engagingly into a complimentary set of hold down openings in the base plate. The seat mounting box is further locked in place by means of a pair of dogs attached to a kick release handle and received into a pair of locking slots in the base plates. A simple tug on the kick release handle disengages the dogs from the locking slots and pulls the seat mounting box rearward, disengaging the hold down cleats. The seat mounting box is further formed so that it will deform under the impact of a frontal collision in such a manner as to cushion the impact of the collision to the seat occupant.

25 Claims, 6 Drawing Sheets

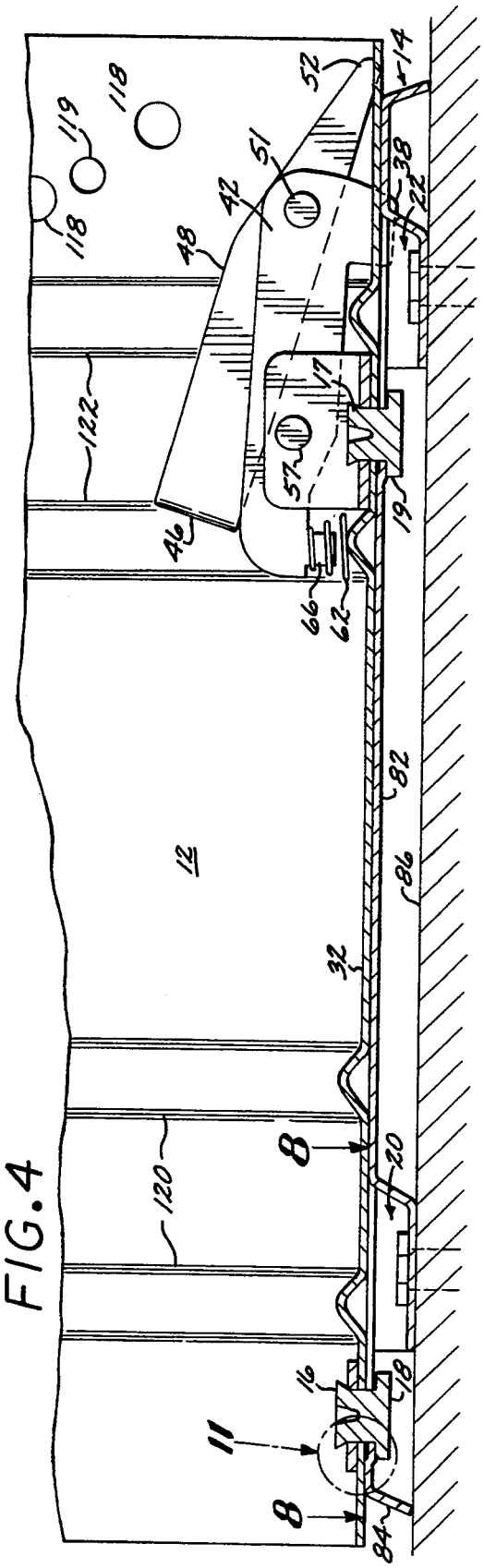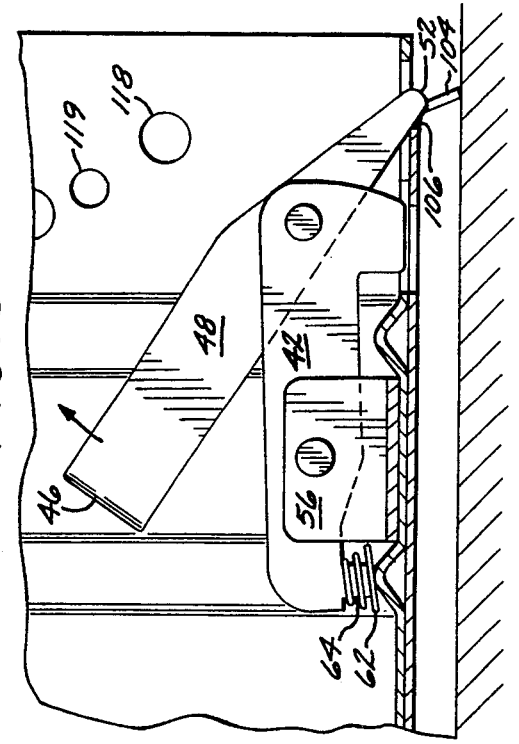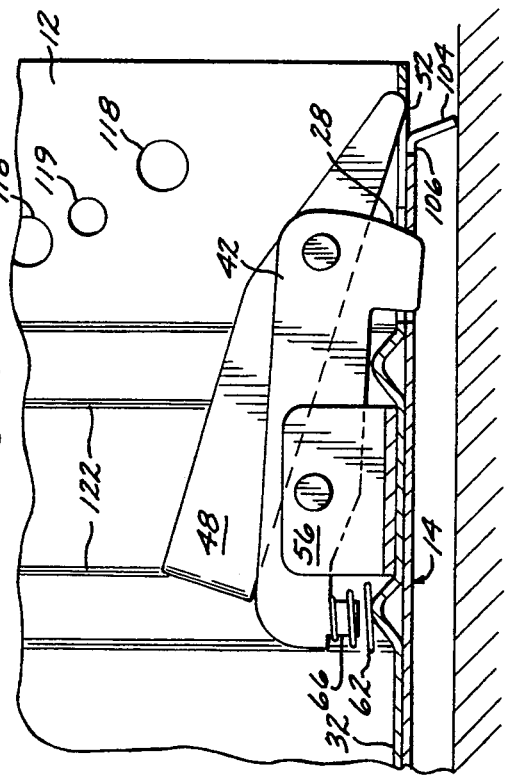

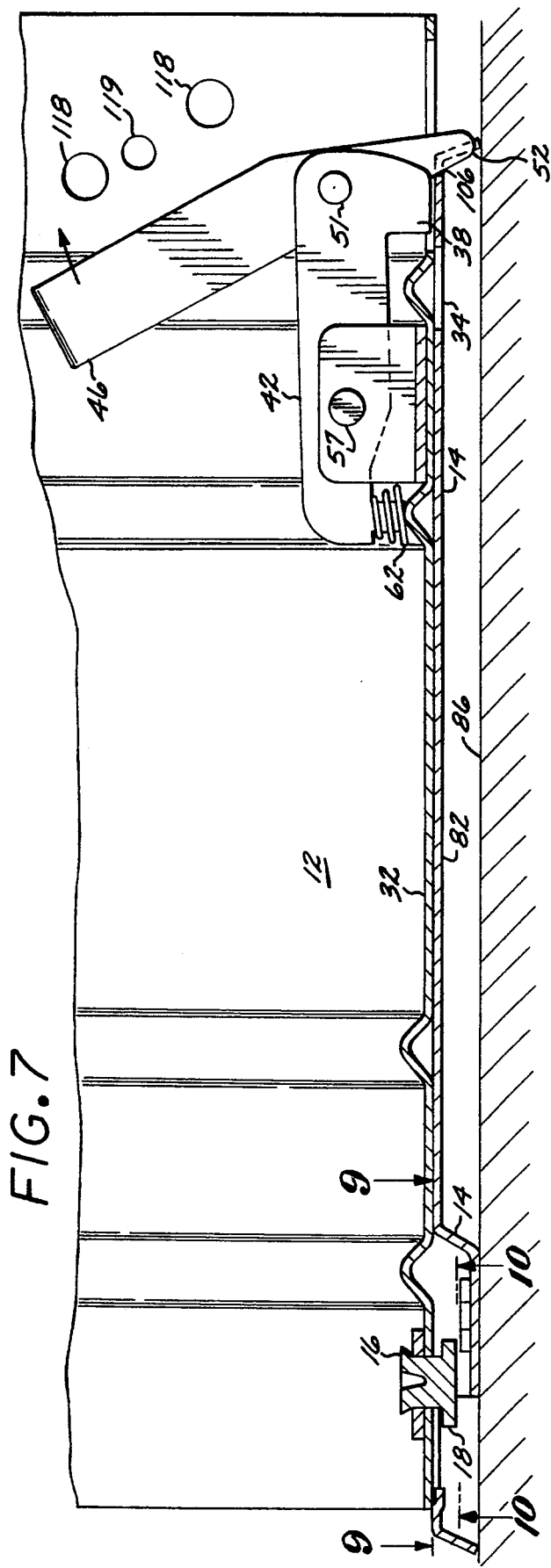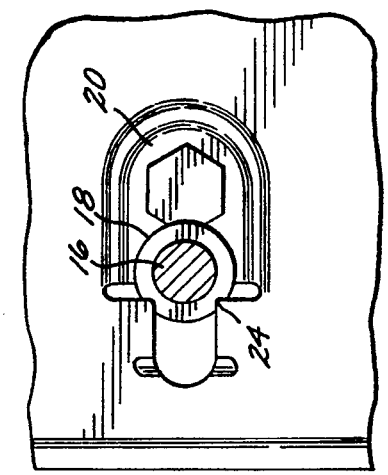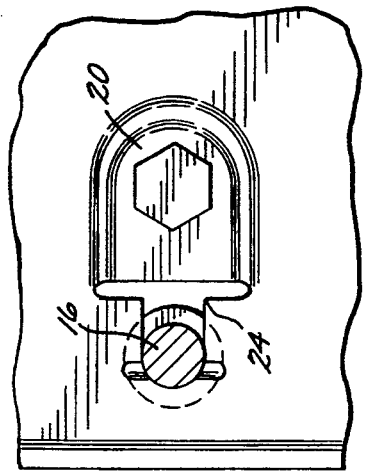

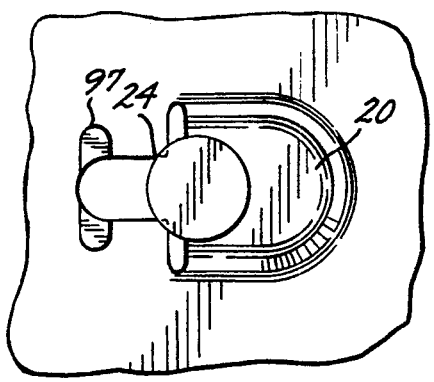
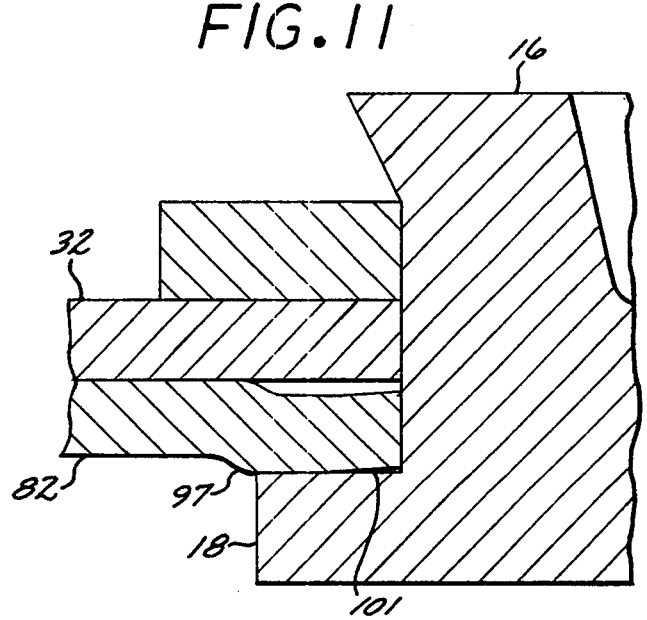
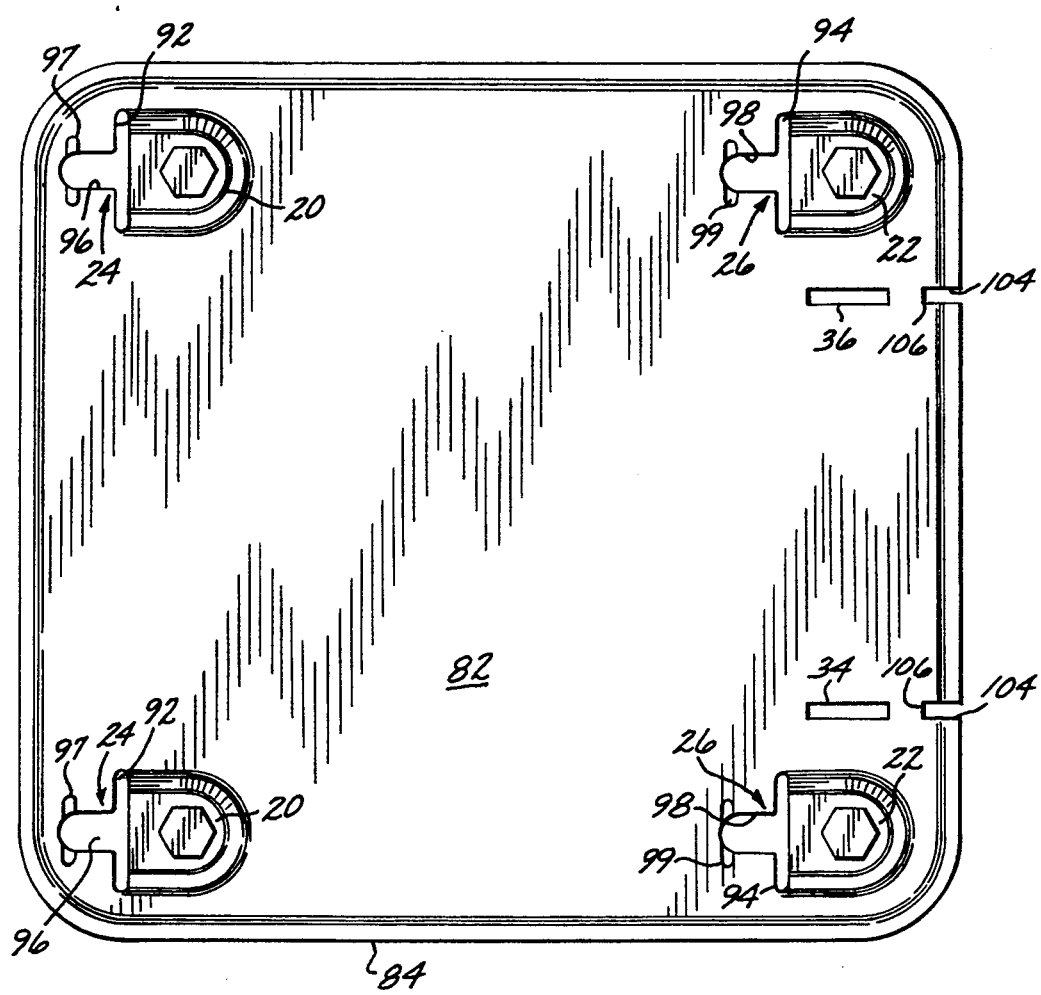

QUICK RELEASE SEAT PEDESTAL

BACKGROUND OF THE INVENTION

1. Field of the Invention:

The present invention relates to a quick release seat pedestal for mounting, for instance, a seat from the floor of a vehicle.

2. Description of the Prior Art:

The present day popularity of recreational vehicles and vans is due in part to the flexibility of these vehicles. An entrepreneur may find a benefit in the vehicle which serves both as transportation for family outings and as a delivery vehicle. Easily removable vehicle seats can greatly increase the utility of such a vehicle by providing increased cargo space for deliveries while permitting more seating when required.

Another trend in vehicle design has been the increasing search for structures which absorb energy to the passenger in the event of a collision. The search is complicated by the need for structures which will deform in a controlled manner to absorb deceleration energy but not collapse. An overly rigid structure transfers all of the stress of a collision to the passenger, increasing the risk of injury. A structure lacking sufficient strength, however, might collapse prematurely or uncontrollably under the impact of a collision causing the passenger to suffer secondary jarring or impact.

The need for flexibility in vehicle seating has lead to the proposals of numerous different mechanisms for locking a seat or a seat pedestal into place on the floor of a vehicle. Examples of such prior removable vehicle seating (or seating pedestals) are disclosed in U.S. Pat. Nos.: 4,277,043; 4,376,522; 4,396,175; 4,667,917; 4,759,580; 4,789,126; 4,805,952; 4,865,377; 4,971,379; 5,125,711. Unfortunately, none of these references addresses the need for a seat pedestal structure which will positively hold the seat in place during normal operating conditions and which is easily operable to be released from the pedestal floor to be quickly removed in an efficient fashion to free the vehicle floor of any significant obstacles.

Many of these references include a base or floor plate which could present an impediment to vehicle loading when the seat has been removed. Notable among these is U.S. Pat. No. 4,805,952 which includes a base plate with a section that is sharply raised to be formed with two transverse slots. This raised portion with its large slots would present an obstacle to the task of fitting objects into the vehicle without damage. In addition, the person loading the van would have to exercise care not to trip over the raised portion or catch his or her feet or shoes in the slots.

Also problematic is the base shown in U.S. Pat. No. 4,667,917 with its transverse elevated bar. While adequate for its intended purpose, it must be recognized that the bar remaining in the vehicle after removal, not only presents a trip hazard to persons moving about in the vehicle but presents an obstacle to objects resting flat on the vehicle floor.

Another problem with the prior art is the complexity of the connecting and locking mechanisms and the potential for an insecure connection allowing for the seat to wobble and shake under vehicle motion. U.S. Pat. No. 4,667,917, for example, includes a base with a transverse bar. The seat pedestal includes a rotatable hook with a handle. The hook connects around the transverse bar to lock the seat into place. In practice, however, it is difficult to construct the bar and the hook with sufficiently close tolerance so that the hook fits snugly and firmly enough around the bar to positively prevent the seat from shifting during vehicle movement. The U.S. Pat. Nos. 4,759,580; 4,865,377; 4,971,379 and 5,125,711 also employ hooks to hold a seat or pedestal in place. In all these cases, the use of the hooks makes for a complicated and somewhat unstable design. In addition, these designs require that the seat be carefully aligned with respect to the base in order to be attached.

U.S. Pat. No. 4,789,126 describes a seat pedestal which locks into place primarily by means of a rotatable locking pin engaging with a circular locking ramp. Although this device also includes three tab/slot combinations to reinforce the connection between base and pedestal, the presence of only one locking point produces a device with some lack of stability.

U.S. Pat. No. Des. 331,342 shows a pedestal design which could deform during impact in such a manner as to help protect the passenger from the collision impact. However, the release employed in practice to hold the pedestal in place fails to provide for secure and stable mounting while providing for a quick and convenient release for removal of the pedestal.

Pedestal anchorage devices have been proposed which incorporate base plates formed with a raised annular track defining an upwardly facing surface formed with key holes within which is received cleat-like fasteners mounted to the underside of the bottom plate of a pedestal box. The box then also includes a retractable pin so that the box may be positioned on the base plate with the cleats received in the enlarged portion of the key holes, the box then rotated to slide the cleats into the elongated grooves of the key holes and the pin then released to lock the box in a rotary position relative to the base plate. A device of this type has been marketed by a company related to applicant, Adnik Recreational, Inc., Elkhart, Ind., under the designation "Removable Pedestal". The box was configured with outwardly and upwardly sloping side walls to collapse and provide energy absorption upon impact. Such devices, while enjoying commercial success and providing satisfactory performance, required the user, in order to release the pedestal, to retract the locking pin, rotate the box and lift it off the seat plate in a rather awkward maneuver. Such removal required torquing or rotating of the box and to release the cleats from the keyways. Consequently, any irregularity or deformity between the box and base plate could result in the locking mechanism becoming hung up thus resisting relative rotary movement and requiring application of greater torque forces. Such requirement for increased torque forces then increased the likelihood of back injury or the like to the pedestal installer. Also, the base plate required an annular raised ring which could contribute somewhat to instability of the mounting of the pedestal box and could fail to provide the desired support for controlled collapse of the pedestal upon impact to thereby possibly reduce the effectiveness of the pedestal box to absorb energy upon impact.

Other box pedestals have been proposed which incorporate a channel-like structure defining an upwardly facing wall, vertical side walls and inturned bottom flanges which were then attached to the rib work of the vehicle floor. A device of this type has been marketed by Auranco Metal Fabrications, 2009 Middlebury Street, Elkhart, Ind. 48515. Such devices have proven awkward to install and remove from the vehicle and do not exhibit the desired strength to assure secure support of the seat and fail to provide for any controlled crushability upon impact of the vehicle.

Consequently, there exists a need for a seat pedestal assembly in which a seat mounting box element could be quickly and easily connected with, and later easily released from, a base plate element attached to the floor of a vehicle and in which presents a solid, wide-stanced connection between pedestal and base. There is also the need for a seat pedestal assembly which will deform under the impact of a frontal collision in such a manner as to cushion the impact of the collision on the seat occupant.

SUMMARY OF THE INVENTION

A quick release pedestal seat mount including a low profile rectangular planar base plate and a seat mounting box which includes a bottom wall and fastening cleats with shanks that project downwardly from the bottom wall to terminate in enlarged in cross section heads. The base plate is formed with a plurality of recesses defining pockets disposed at the four corners thereof and formed with respective forwardly extending key hole shaped fastener openings for sliding receipt of the respective cleats.

A pair of laterally spaced apart latching slots are formed in spacial alignment in the base plate and bottom wall of the mounting box, respectively. A lock mechanism is formed by a pair of rocker arms pivotally mounted on a pair of upwardly projecting ears attached to the bottom plate. Each rocker arm is formed with a free extremity defining a downwardly projecting dog configured to project through respective aligned latching slots to lock the bottom wall against movement relative to the support plate to secure such cleats in their locked positions.

In the preferred embodiment, the box includes reinforcing ribs pressed from such bottom wall and side walls to thereby provide a desired degree of resistance by the forward portion of such side walls to downward collapse upon loading thereof by a passenger constrained therein upon impact of the forwardly moving vehicle to thereby provide for a gauged deformation under the passenger load and consequent shock absorption. The mounting box is further formed with a pair of upwardly and outwardly diverging side walls on the opposite sides of the bottom wall. These side walls are turned in at the upper edges to form seat mounting flanges.

Other objects and features of the invention will become apparent from consideration of the following description taken in conjunction with the accompanying drawing.

BRIEF DESCRIPTION OF THE DRAWINGS

FIG. 4 is a partial vertical sectional view taken along the line 4—4 of FIG. 2;

FIG. 5 is a partial vertical sectional side view taken along the line 5—5 of FIG. 2;

FIG. 6 is a partial vertical sectional side view taken along the line 5—5 of FIG. 2;

FIG. 7 is a vertical sectional side view, in enlarged scale, taken along the broken line 7—7 as shown in FIG. 2, and showing the mount unlocked from the base plate.

FIG. 8 is a horizontal sectional view taken along the line 8—8 of FIG. 4;

FIG. 9 is a horizontal sectional view taken along the line 9—9 of FIG. 8;

FIG. 10 is a horizontal sectional view taken along the line 10—10 of FIG. 7;

FIG. 11 is a detailed view, in enlarged view, taken from the circle designated 11 in FIG. 4;

FIG. 12 is a top plan view of a second embodiment the quick release pedestal mount embodying my present invention;

DESCRIPTION OF THE PREFERRED EMBODIMENTS

Figure 1:
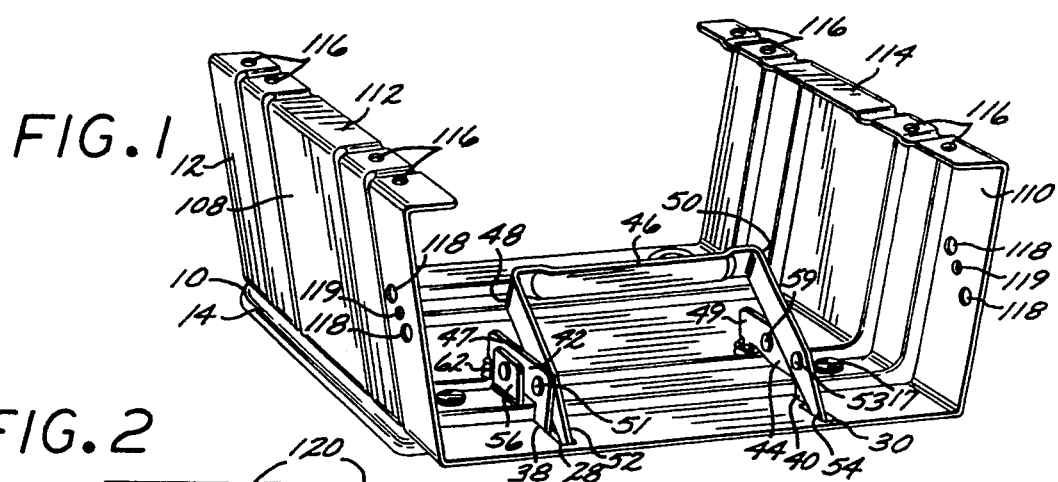
FIG. 1 is a perspective view of a quick release pedestal mount embodying the present invention.
Figure 2:
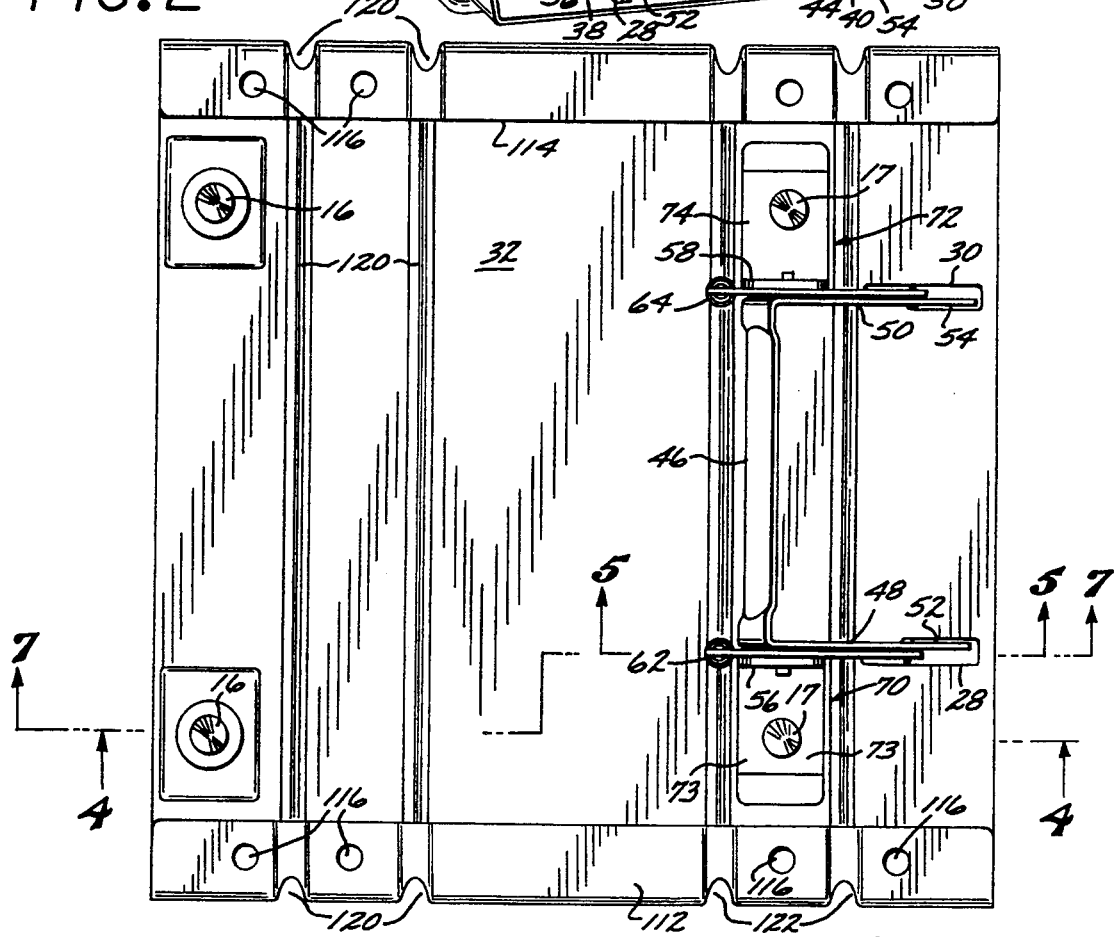
FIG. 2 is a top plan view, in enlarged scale, of the pedestal mount shown in FIG. 1.

Referring to FIG. 1, the quick release pedestal mount 10 of the present invention includes, generally, a seat mounting box 12 carried releasibly on and fastened to a rectangular low profile base plate 14 by means of front and rear pairs of over-sized rivets defining hold-down cleats 16 and 17 formed with respective enlarged heads 18 and 19 respectively (FIGS. 2 and 4). The heads 18 and 19 are arranged to be received in respective front and rear pairs of recesses which define pockets 20 and 22 in the base plate 14. Such box 12 may be slid forwardly to engage such cleats 16 and 17 into front and rear pairs of key hole shaped fastener openings, generally designated 24 and 26, formed in the base plate forwardly of the respective pockets 20 and 22 (FIG. 12).

Referring to FIGS. 1 and 5, laterally spaced apart clearance slots 28 and 30 are formed in the bottom wall 32 of the mounting box 12. Lock slots 34 and 36 are formed in the base plate (FIG. 12) in positions corresponding with clearance slots 28 and 30. These corresponding pairs of slots, when aligned, releasibly receive respective downwardly projecting dogs 38 and 40 (FIGS. 1 and 5) formed at the rear ends of respective horizontally disposed rocker arms, generally designated 42 and 44.

Carried pivotally from the rear ends of such rocker arms is a kicker, generally designated 46, formed with laterally disposed lever arms 48 and 50. Such lever arms are rotatably attached to rocker arms 42 and 44 by means of respective pivot pins 51 and 53 and are formed at their free extremities with respective nose cams 52 and 54 which are configured to, upon raising of the rear of the kicker 46, orbit downwardly and engage the support plate as shown in FIG. 7 to, upon continued orbiting, raise the respective dogs 38 and 40 out of engagement with the respective base plate lock slots 34 and 36 and to kick the seat mounting box 12 rearwardly relative to the base plate 14 to thereby disengage the respective front and rear pairs of cleats 16 and 17 from the respective pairs of fastener openings 24 and 26 (FIG. 12).

The rocker arms 42 and 44 include respective horizontal beams 47 and 49 (FIG. 1) formed at their respective rearward extremities with downturned hooks defining the respective dogs 38 and 40. Referring to FIGS. 4-6, the forward extremities of such arms are formed with respective downturned spring-retaining pegs 66. Referring to FIGS. 1, 2 and 5, the rocker arms 42 and 44 are carried from respective ears 56 and 58 by means of respective pivot pins 57 and 59. Coil compression springs 62 and 64 are sandwiched between the front ends of the respective rocker arms and the bottom wall 32 and have their top ends coiled about the downwardly projecting pegs 66 to urge such arms clockwise as viewed in FIG. 5.

The upwardly projecting ears 56 and 58 are formed by the vertical flanges of respective angles, generally designated 70 and 72. The respective horizontal flanges 73 and 74 are secured to the top side of the bottom wall 32 by means of the flared out top ends of the respective rearward pair of rivet fasteners 17 (FIG. 4).

As shown in FIG. 12 the base plate 14 is generally square in plan view with rounded corners and includes a central slightly elevated but suspended planar sheet 82 (FIG. 12) formed at its marginal edges with a down turned peripheral rim 84 which serves to support the sheet and elevate it about ⅜" from the floor 86 of the vehicle as shown in FIG. 7. Formed at the four corners of such plate are the respective front and rear pairs of horseshoe shaped downwardly depressed pockets 20 and 22 which are formed at their front extremities with transversely extending receiver slots 92 and 94, respectively, which form the enlarged portions of the respective front and rear pairs of key hole shaped fastener openings 24 and 26, respectively. These openings are further formed with reduced in transverse width slide grooves 96 and 98 respectively, projecting forwardly from receiver slots 92 and 94 respectively.

Referring to FIGS. 10-12, formed at the forward extremities of the respective slide grooves 96 and 98 are downwardly depressed dimples 97 and 99, respectively, which are resilient and angle forwardly and downwardly to define wedge respective surfaces 101 (FIG. 11).

With continued reference to FIG. 12, formed at the front extremity of the base plate 14 are respective open ended release slots 104 terminating at their respective closed ends in cam abutment surfaces 106 for engagement by the respective nose cams 52 and 54 (FIGS. 1 and 6).

Figure 3:
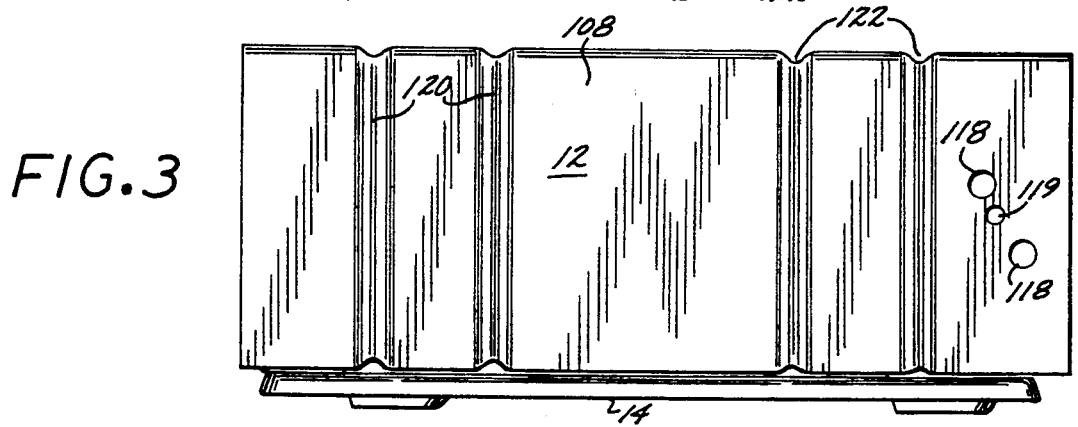
FIG. 3 is a left side view, in enlarged scale, of the pedestal mount shown in FIG. 1.

Referring now to FIGS. 1, 2 and 3, the mounting box 12 is conveniently formed of 14 gauge sheet metal and is configured with oppositely disposed, upwardly and outwardly angled side walls 108 and 110 which then turn inwardly at their upper extremities to form seat mounting flanges 112 and 114, respectively, for receipt of the opposite sides of a passenger seat (not shown) to be mounted thereon. Mounting holes 116 are provided for receipt of mounting bolts to mount the seat. Seat belt mounting bores 118 and 119 are formed at the rear of the side walls for receipt of bolts to mount seat belt fittings (not shown).

The mounting box 12 is further formed with pairs of forwardly and rearwardly disposed pressed out wrinkles defining reinforcing ribs 120 and 122 which wrap around the lower corners to reinforce the box and cooperate with the thickness and strength of the bottom and side walls 108 and 110 to provide a predetermined supporting force to resist the downward forces applied to the front thereof by a restrained passenger in the event of a frontal vehicle collision.

In operation, the seat mounting box 12 is installed on the base plate 14 by placing the pedestal 10 on the base 14 so that front and rear cleats 16 and 17, respectively, nest into the front and rear pockets 20 and 22 in the base (FIGS. 2 & 4). The pedestal 10 is then pushed forwardly causing the cleat heads 16 and 17 to slide through the fastener opening slots 92 and 94. The cleat shanks will then pass through the slide grooves 96 and 98 to engage the upwardly facing shoulders of the rivet heads under the respective dimples to engage the respective wedge surfaces 101 to hold the box tightly to the base plate and prevent vibration between the two.

Figure 15:
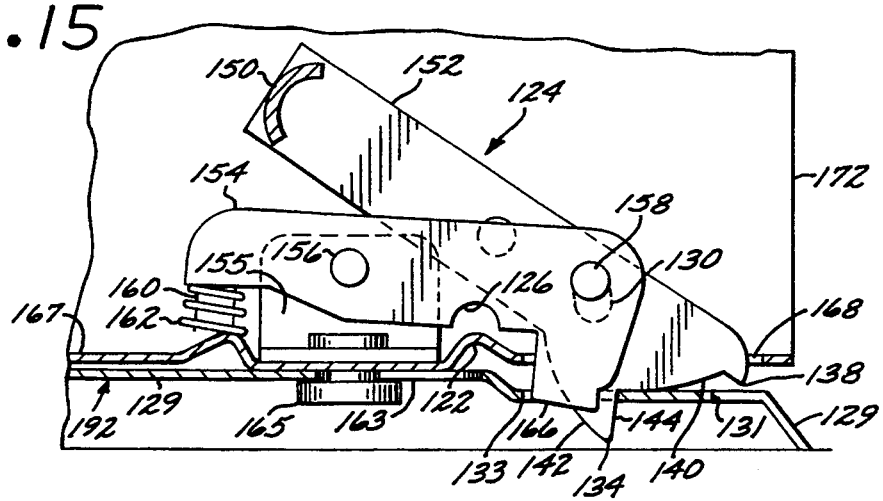
FIG. 15 is a partial vertical sectional side view taken along the line 15—15 of FIG. 13.

Such engagement of the cleat shanks with the front ends of the slide grooves 96 and 98 will register the respective dogs 38 and 40 over the respective lock slots 34 and 36 in the base plate to allow the respective springs 62 and 64 to bias the rocker arms clockwise around their respective pivot pins to drive the respective dogs downwardly into such lock slots and lock the box firmly in its forward locked position. In this position, the weight of the kicker handle 46 will maintain the kicker rotated to its counterclockwise retracted position as shown in FIGS. 4, 5 and 15.

Should the vehicle in which the subject pedestal is mounted become engaged in a frontal impact, the vehicle floor and base plate 14 will typically be abruptly stopped. The momentum of the passengers will typically thus be thrust forwardly against the restraint system anchored to the fastener bores 118 and 119 thus applying an upward and forward force to the rear extremities of the respective side walls 108 and 110 due to the force of the passenger acting forwardly on such restraint mechanism. The momentum of the passenger will also typically act downwardly on the front extremity of the seat thus applying downwardly compressive forces on the forward extremities of the side walls. Consequently, the upwardly and forwardly acting forces on the rear extremity of the side walls will tend to draw the upper extremities of such side walls upwardly and inwardly against the restraint provided by the heads of the respective rearward pair of cleats 17 held captive under the base plate 14 at the marginal edges of the rearward pair of slide grooves 98. This action will thus tend to raise the rearward ends of the side walls while the forward and downward force of the decelerated passenger on the front of the seat (not shown) tends to drive downwardly on the forward extremity of the seat thus pressing downwardly on the forward extremity of the mounting flanges 112 and 114 at the tops of the respective side walls 108 and 110 (FIG. 1). The forward extremities of such side walls will thus tend to buckle and, upon application of a predetermined downward force, will buckle outwardly in their medial forward portions to thus absorb some of the energy generated as a result of the frontal impact. By constructing the box of 14 gauge, grade 1023 high maganese 0.24 sheet metal and forming the pairs of forwardly and rearwardly disposed transverse reinforcing ribs 120 and 122 wrapped around the lower corners to cooperate in providing the necessary resistance to downward and outward flexing of such side walls at the front extremities of the box, combined with the ten degree upward and outward angle of such side walls I have selected, I have discovered the construction of the present invention will meet federal criteria legislated for reducing head injury and commonly referred to as head injury criteria (HIC).

It will be appreciated that, even on rebound of the passenger's weight from the restraint system, the engagement of the rocker arm dogs 38 and 40 with the ends of the respective lock slots 34 and 36 will serve to prevent significant rearward shifting of the box relative to the mounting plate 14. Thus, even with any rear end collision or rebound from a frontal collision, the pedestal box will be held locked firmly in position with the hold down cleats positively securing it and the supported seat in position for the safety of the passenger.

In the event the recreational vehicle in which the pedestal is installed is to be used for the transportation of goods or products, the pedestal box may expeditiously be removed. This task is expeditiously accomplished by the user merely grasping the kicker 46 in the position shown in FIG. 5 and rotating it upwardly and forwardly to thus orbit the kicker arms 48 and 50 about the pivot pins 42 and 44 to drive the nose cams 52 and 54 downwardly through the respective clearance slots 28 and 30 in the bottom wall to pass downwardly into the release slots 104 to engage the back edges 106 thereof so that continued clockwise rotation of such kicker, as shown by the direction of the arrow in FIG. 6, will provide for the upward forces thereon to lift the rear extremities of the rocker arms 42 and 44 thus raising the dogs 38 and 40 clear of the lock notches 34 and 36. Continued clockwise rotation of the kicker from the position shown in FIG. 6 will further cause such kicker to apply a rearwardly acting force on the respective rocker arms and, consequently, draw the box rearwardly to the receiver position with the cleats clear of the keyhole slots 92 and 94 (FIG. 12) and the cleat heads 18 and 19 positioned in the respective pockets 20 and 22 clear of the underside of the base plate. The box may then be easily and conveniently picked up to dismount it from the base plate and remove it from the vehicle. Thereafter, the base plate 14 provides a relatively low profile without significant projecting obstructions so that products and packages may be conveniently loaded into the vehicle without encountering significant obstacles and enabling passengers to move about in the vehicle without concern for stumbling over high profile projections.

Figure 13:
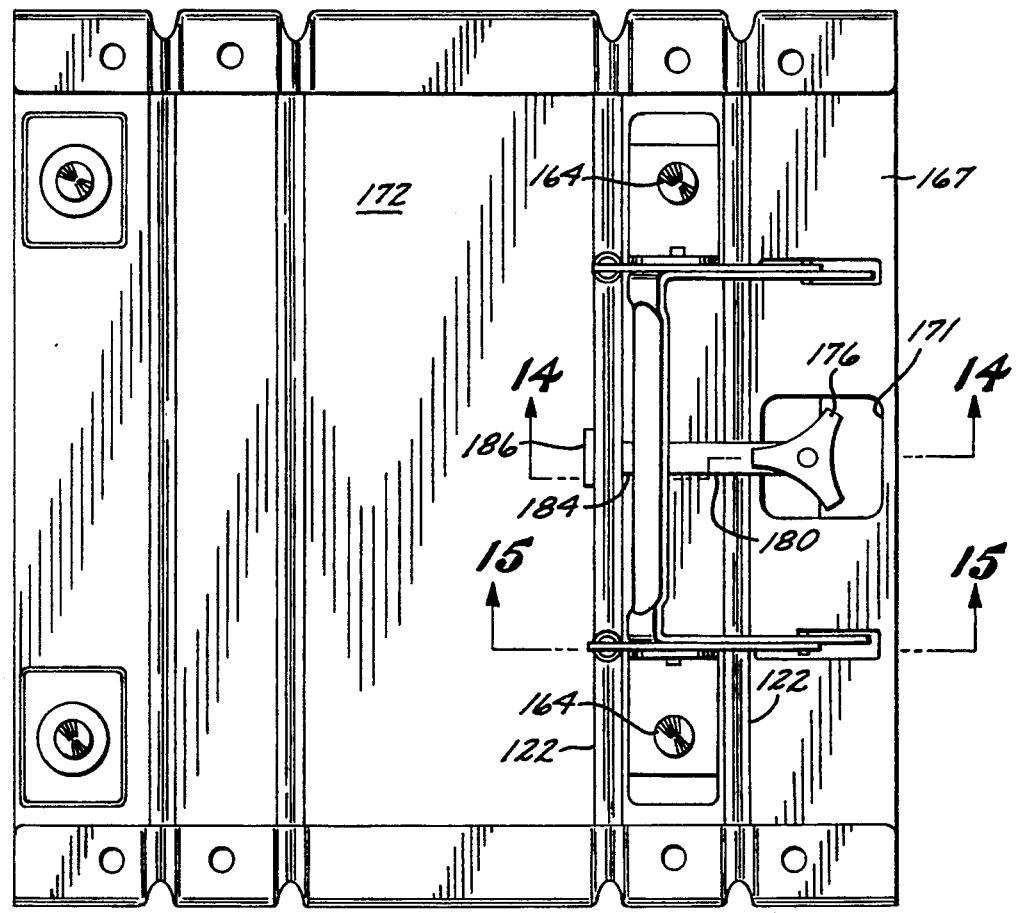
FIG. 13 is a top plan view of a second embodiment of a quick release pedestal mount embodying my present invention.
Figure 14:
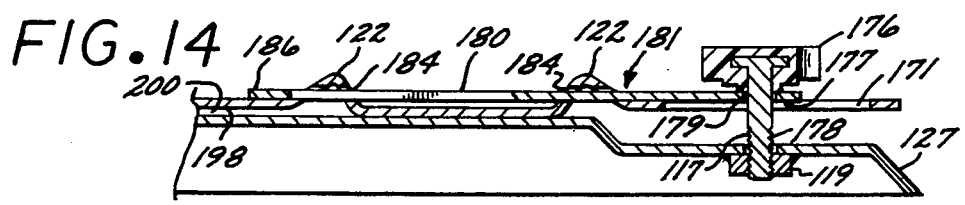
FIG. 14 is a partial vertical sectional side view taken along the line 14—14 of FIG. 13.

The embodiment of the pedestal mount shown in FIGS. 13–18 is similar to that shown in FIGS. 1–12 and incorporates a base plate, generally designated 192, formed with the peripheral downturned flange 127 supporting the suspended central plate 200 which is formed with the respective release slots 129 (FIG. 17) terminating in their respective forward extremities with the cam edges 131. Formed forwardly thereof are release notches 133 formed at their rearward ends with cog tooth engaging edges 135. The base plate further includes a bore 117 formed centrally in the rearward portion thereof (FIG. 14). Welded under such bore in alignment therewith is a nut 119. Formed in the suspended central plate 200 of the base plate are respective front and rear pockets, each forming key hole-shaped hold down slots 163.

A pedestal box, generally designated 172, is formed with clearance slots 168 and carries ears 155 on the bottom wall thereof which mount the rocker arms, generally designated 154, by means of pivot pins 156. The rocker arms 154 are formed at their rearward extremities with downwardly projecting dogs 166. Such rocker arms are formed medially with respective downwardly opening clearance notches 126 for clearing the reinforcement wrinkles defining the reinforcing ribs 122. Referring to FIGS. 14–18, the forward extremities of such arms are formed with respective downturned spring-retaining pegs 160. Coil compression springs 162 are sandwiched between the front ends of the respective rocker arms and the bottom wall 167 and have their top ends coiled about the downwardly projecting pegs 160 to urge such arms clockwise as viewed in FIG. 15.

Figure 16:
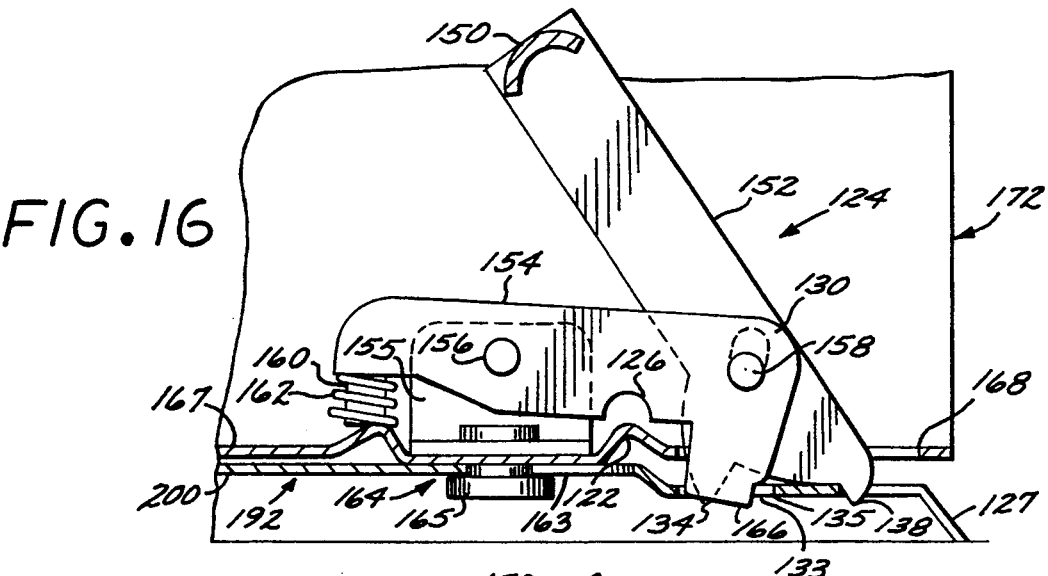
FIG. 16 is a partial vertical sectional side view similar to FIG. 15.
Figure 17:
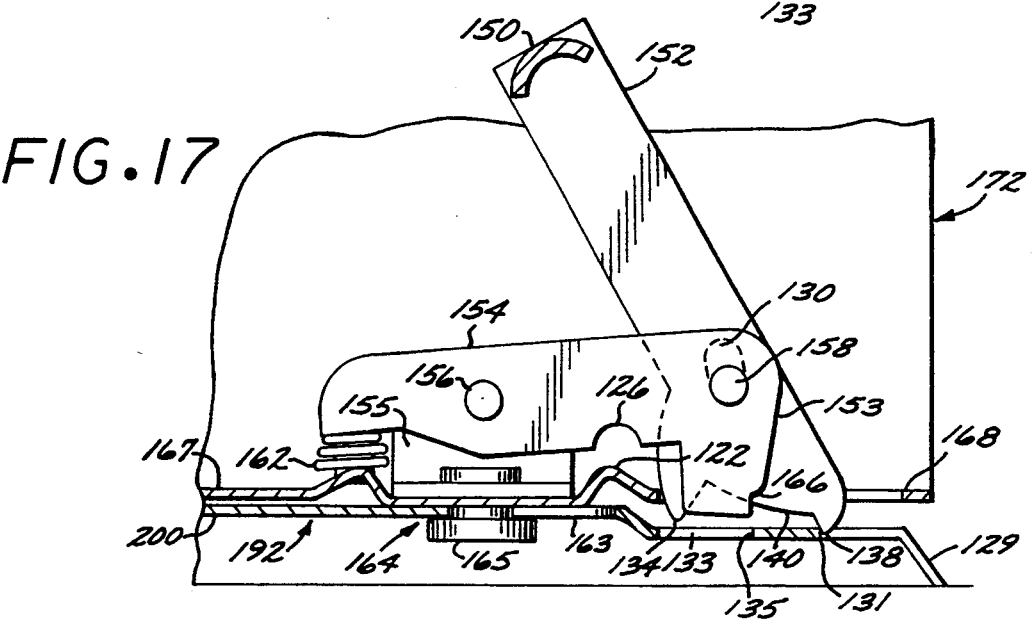
FIG. 17 is a partial vertical sectional side view similar to FIG. 15.
Figure 18:
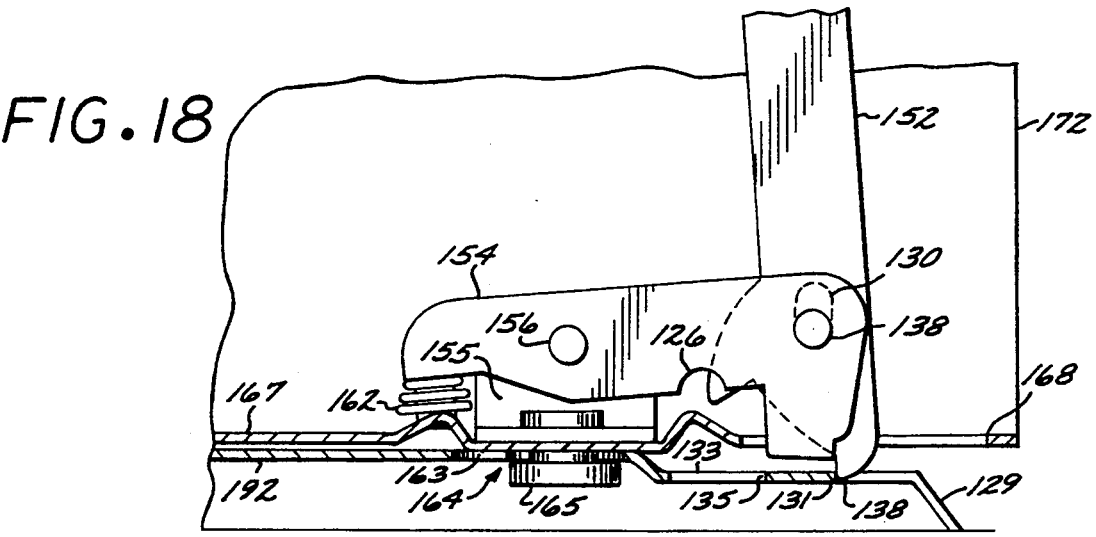
FIG. 18 is a partial vertical sectional side view similar to FIG. 15.

Carried from the upper portion of the dogs 166 by means of pivot pins 158 is a kicker handle, generally designated 124, which incorporates laterally spaced apart kicker arms 152 connected together at their one extremity by means of a laterally extending hand grasp handle 150. Formed at the opposite end of such arms 152 are respective nose cams 138 which are formed with forwardly facing cam surfaces configured to be received in the slots 129 and engage the cam edges ends 131 as shown in FIGS. 16–18. The arms 152 are further formed with an arcuate rider surface 140 which curve forwardly from the respective nose cam 138 to then turn radially outwardly and form respective cog teeth 134 having rearwardly facing tooth surfaces 144 for engagement with the respective release slot ends 135. The respective arms 152 are mounted to the respective rocker arms 154 by means of elongated pivot slots 130 which receive the pivot pins 158 to provide for limited lost motion between such kicker arms and rocker arms as the rocker arm is raised up to the position shown in FIG. 15.

Referring to FIG. 13, the bottom wall of the box 172 is formed in its rearward central section with a window 171. Formed forward of such window are front and rear pairs of over-sized rivets defining hold-down cleats 164 having respective enlarged heads 165 (FIGS. 13 and 15). The heads 165 are arranged to be received in respective front and rear pairs of recesses which define key-hole shaped hold down slots 163 in the base plate 192. Such box 172 may be slid forwardly to engage such cleats 164 into front and rear pairs of hold down openings 163. Formed in the reinforcing ribs forward of such window 171 are respective laterally extending slots 184 which receive therein the longitudinal shank 180 of a flexible tether, generally designated 181. The tether is formed on its forward extremity with a laterally projecting cross member 186 to define a T shape and act as a stop to limit forward telescopical movement of such tether. In the preferred embodiment the tether is constructed of a high density plastic. The tether mounts at its free extremity to a safety knob 176 which includes in its underside a bearing race 177 which is press fit into a bore 179 in the free end of such tether. Carried from the knob 176 is a threaded shaft 178 which is received through the bore 117 in the base plate 192 to screw into a threaded bore and the nut 119 welded thereto (FIG. 14).

The pedestal mounts shown in FIGS. 13–18 operate similar to that for the mount shown in FIGS. 1–12. It will be appreciated that, in practice, the base plate 192 may be integrated into the floor of the vehicle or may be installed in the aftermarket for installation by the owner. The base plate 192 is bolted to the floor of the recreational vehicle and when it is desirable to mount the pedestal box 172, it is positioned over such base plate with the cleats 164 received in the pockets rearward of the key way shaped hold down openings. The positioning of the box in the position shown, for instance, in FIG. 8 relative to the base plate 192 serves to position the dogs 166 and cog teeth 134 generally over the respective slots 133. By reaching under the seat mounted on the box, the operator may then merely grasp the hand grasp handle 150 to rotate the kicker arms 152 counterclockwise to thus rotate them about their respective pivot pins 158 causing the cog tooth surface 144 to engage the forwardly facing slot end 135 (FIG. 15) so that further counterclockwise rotation will, because of the horizontal alignment of the respective pins 156 and 158, drive the respective rocker arms forwardly to thus also drive the box 172 forwardly relative to the base plate to dispose it in its locking position.

When engaged in such locking position with the cleats 164 fully forward in the hold down slots, the user can check the positioning by grasping the safety handle 176 and pulling it rearwardly to the full extent allowed by the stop 186 (FIG. 14). Then, if the threaded shaft 178 aligns with the bore 117 in the base plate and the underlying nut 119, by merely rotating the handle 176 the shaft will screw into the nut 119. This then provides an additional safety feature whereby the operator can be assured that the hold down cleats 164 have been securely locked in their locking position. Subsequently, when it becomes desirable to remove the seat from the vehicle, the operator can quickly and rapidly grasp the safety knob 176 and unscrew the shaft 178 from the nut 119 thus freeing the tether 181.

The operator may then grasp the handle 158 and raise the kicker arms 152 from their retracted position thereby rotating such arms counterclockwise. It will be appreciated that the lost motion slot 138 in the rocker arms 152 will provide for initial travel of the pivot pin and rotation of the rocker arms in a clockwise direction before any appreciable upward force is applied to the rearward extremities of the respective rocker arms 154. When the bottom ends of the respective slots 130 engage the pivot pins 158, as shown in FIG. 16, further rotation of such kicker arms 152 in the clockwise direction will apply an appreciable upward force component to the rear ends of the rocker arms 154 thus raising the dogs 153 upwardly to the position shown in FIG. 17.

Continued rotation of the kicker arms 152 beyond this release position will cause the nose cam 138 to engage the edge 131 (FIGS. 17 and 18) so that continued rotation of the rocker arms 152 will draw the box 172 rearwardly to thus draw the cleats 164 rearwardly of the hold down slots 163 to thereby free such box from attachment to the base plate 192 for convenient removal thereof.

From the foregoing, it will be appreciated that the pedestal mount of the present invention is of inexpensive and sturdy construction and will provide for convenient installation and removal of the pedestal box. The box when secured in position on the base plate will provide a sturdy and secure support and is itself convenient to install and remove.

Various modifications and changes may be made with regard to the foregoing detailed description without departing from the spirit of the invention.

What is claimed is:

1. A quick release pedestal seat mount to support a passenger seat from the floor of a recreational vehicle of the type designed to travel in a forwardly longitudinal direction and comprising:

a base plate for mounting on said floor and including a pair of laterally spaced apart fastening slots and a plurality of hold down openings;

a seat mounting box to be disposed in a locking position over said base plate and including a bottom wall disposed over said base plate and formed with a pair of clearance slots aligned over said base plate fastening slots, said box further including upstanding side walls formed at their upper extremities with seat mount flanges;

a plurality of hold down cleats carried from said bottom wall and engageable when said box is in said locking position, with the respective said hold down openings to hold said box down on said plate;

a pair of ears mounted on said bottom wall forwardly of said clearance slots;

a pair of longitudinally extending rocker arms pivotally mounted on said ears and formed on their rearward extremities with downwardly projecting dogs configured to project through the respective said clearance slots to engage said base plate fastening slots;

bias means interposed between said rocker arms and said bottom wall to bias said rocker arms in a predetermined rotary direction to urge said dogs into engagement with said base plate fastening slots;

a pair of elongated kicker arms for pivotal mounting from the respective rearward extremities of the respective said rocker arms adjacent the respective said ears, joined on their respective one extremities by a transverse handle and formed on the respective opposite ends with respective nose cams for engagement with said base plate, said kicker arms being operative upon rotation thereof in one direction of rotation from a retracted position to engage the respective said nose cams with said base plate and upon continued rotation in said one direction to a disengagement position, to rotate said kicker arms in the direction opposite said predetermined direction against said bias means to raise the respective said dogs clear of the respective said fastening slots; and pivot pins mounting the respective said kicker arms from said rocker arms.

2. The seat pedestal assembly of claim 1 wherein: said bias means is in the form of a coil compression spring.

3. The seat pedestal assembly of claim 1 wherein: said bottom wall projects rearwardly under the forward extremities of said opposite ends of said kicker arms and is formed with notches for passage therethrough of the respective said nose cams.

4. The seat pedestal assembly of claim 1 wherein: said base plate is formed with said hold-down openings configured in the form of a keyway opening.

5. The seat pedestal assembly of claim 1 wherein: said seat mounting box is formed with transverse reinforcing ribbing.

6. The seat pedestal assembly of claim 1 wherein: said base plate is formed at its marginal edge with a downturned support rim.

7. The seat pedestal assembly of claim 1 wherein: said base plate is formed from sheet metal to define a suspended planar sheet formed at its marginal edges with a downturned support rim configured to engage said floor.

8. The seat pedestal assembly of claim 5 that includes:

a locking mechanism mounted on said box and releasably engaging said base plate mechanism to positively lock said pedestal in place against accidental release.

9. The seat pedestal assembly of claim 8 wherein:
said base plate includes a threaded aperture;
said locking mechanism includes a threaded bolt for threadably engaging said threaded bore.

10. The seat pedestal assembly of claim 9 wherein:
said locking mechanism includes a locator fastening said bolt to said box to be, when said box is in said locking position, be aligned with said threaded bore for screwing therein.

11. The seat pedestal assembly of claim 8 wherein:
said base plate is formed with a threaded bore;
said bottom wall of said box is formed with a fastener bore aligned, when said box is in said locking position, with said threaded bore;
said locking mechanism includes an elongated tether fastened on one extremity to said box and carrying said bolt on the opposite end thereof to, when said box is in said locking position on said base plate, be aligned with said threaded bore.

12. The seat pedestal assembly of claim 11 wherein:
said seat mounting box is formed with transverse reinforcing ribbing.

13. The seat pedestal assembly of claim 11 wherein:
said box is formed with a slot for free telescopical receipt of one extremity of said tether; and
said tether is flexible and is formed on said one extremity with an enlarged cross section to act as a stop to stop said tether from disengagement from said box and engaged to, when said box is in said locking position, said stop is engaged with said box to position said bolt in alignment with said threaded bore.

14. The seat pedestal assembly of claim 1 for use with a vehicle designed to standards taking into account the mounting of a seat of a predetermined construction on said mounting flanges to support a simulated passenger of a predetermined stature and weight constrained in said seat by a predetermined constraint system and further taking into account a predetermined frontal impact at a predetermined speed wherein:
said box is formed with opposed bottom corners mounting said side walls to slope upwardly and outwardly at a predetermined angle and includes reinforcing ribs extending along said bottom wall around said corners and up said side walls, said sides, said bottom, corners, side walls and ribs cooperating to, when said vehicle encounters said predetermined frontal impact with said predetermined passenger impacting said restraint system, to provide for said side walls at the front extremities thereof to flex outwardly and downwardly.

15. The seat pedestal assembly of claim 1 for mounting a seat designed to withstand a force acting downward on the front end thereof with a sufficient magnitude to apply a predetermined force downwardly on the front extremities of said mounting flanges and said box includes restraint corner elements connecting said side walls to said bottom wall, to angle said side walls upwardly and outwardly at a respective predetermined angle, said corner elements being constructed to, when said predetermined force is applied to said front extremities of said flanges, provide for said side walls to flex outwardly and downwardly beyond the respective said predetermined angles.

16. The seat pedestal assembly of claim 1 wherein:
said base plate includes a cam edge disposed in the path followed by said nose cam as said kicker arms are rotated in said one direction past said disengagement position, to draw said box rearwardly on said base plate from said locking position.

17. The seat pedestal assembly of claim 16 wherein:
said kicker arms are formed with elongated slots for receipt of the respective said pivot pins to provide for a predetermined amount of rotation of said rocker arms in said one direction from said retracted position prior to engagement of said nose cam with said cam edge.

18. The seat pedestal assembly of claim 1 wherein:
said base plate is formed with cleat-receiving pockets disposed rearward of the respective said holddown openings and cog slots terminating in respective cog-engagement surfaces facing in said one direction of rotation, said box is positionable in a receiver position on said base plate with said cleats received in said pockets; and
said rocker arms are formed adjacent the respective said nose cams with respective cogs configured and arranged to, when said box is in said receiver position on said base plate and said rocker arms are rotated in a disengagement direction opposite said one direction from said disengagement position to said retracted position, engage the respective said cog engagement edges to, upon further rotation in said engagement direction, draw said box rearwardly on said plate to said locking position.

19. The seat pedestal assembly apparatus for mounting a passenger seat to the floor of a recreational vehicle of the type designed to travel primarily in a forward direction, said mount apparatus comprising:
a rectangular in plan view low profile base plate including a peripheral flange for mounting on said floor and a suspended planar sheet formed with four downwardly recessed pockets disposed adjacent the respective corners thereof;
key way shaped hold down openings projecting forwardly of said pockets and formed with reduced-in-cross section slider grooves;
a pedestal box for mounting a passenger seat from said base plate, said box having a receiver position rearward on said base plate and being slidable forwardly to a locking position, and including downwardly projecting cleats formed with respective shanks for slidable receipt forwardly in said hold down openings and respective enlarged heads for receipt in the respective said pockets to be slid forwardly under said suspended sheet upon shifting of said box to said locking position for engaging the underside of said suspended sheet on the opposite sides of the respective hold down openings; and
a locking device mounted on said box and releasably engageable with said base plate to lock said box forwardly in said locking position whereby said box may be registered in said receiver position on said base plate and shifted forwardly to said locking position and said locking device locked to lock said box against movement relative to said base plate.

20. The seat pedestal assembly of claim 19 wherein:
said cleats are formed with heads having upwardly facing shoulders; and
said base plate is formed on its bottom side at the forward end of the respective said key way shaped slots with respective downwardly and forwardly inclined wedge surfaces arranged for slidable engagement with the shoulders of the respective said fastener bodies to, when said box is slid forwardly into said locking position, apply a downward force on the respective said shoulders.

21. The seat pedestal assembly of claim 19 wherein:
said base plate is formed at said forward ends of said receiver slots with resilient tabs configured so that the respective undersides thereof define the respective said wedge surfaces.

22. A quick release pedestal seat mount to support a passenger seat from the floor of a recreational vehicle of the type designed to travel in a forwardly longitudinal direction and comprising:
   a base plate for mounting on said floor and including a plurality of hold down openings and a fastener slot;
   a mounting bracket including a bottom wall to be positioned on said base plate in an engagement position and to then be slid forwardly thereon to a locking position and being formed with clearance slot aligned, when said bracket is in said locking position, over said base plate fastening slot;
   a plurality of hold down cleats carried from said bottom wall and engageable, upon position of said bracket in said locking position, with said hold down openings to hold said bracket down on said plate; and
   a lock device mounted on said bottom wall and engageable with said base plate to lock said bracket in said locking position whereby said lock may be unlocked and said bracket slid rearwardly to clear said cleat through said hold down opening so said bracket may be detached from said base plate.

23. The locking apparatus of claim 22 wherein:
said base plate includes a fastening slot; and
a rocker arm carried pivotally from said bottom wall and formed on one end with a dog for engaging said fastening slot to hold said box forwardly in said locking position.

24. The locking apparatus of claim 23 that includes:
an elongated kicker arm carried on one end from said rocker arm and formed on its opposite extremity with a hand grasp handle to be grasped to rotate said rocker arm to disengage said dog from said fastening slot.

25. The seat pedestal assembly of claim 23 wherein:
said base plate includes a threaded bore;
a safety lock to positively lock the pedestal in place against accidental release, said safety lock including a flexible tether connected on one end to said box and a threaded bolt carried from the free end of said tether for screwing into said threaded bore.

* * * * *